Patented July 14, 1931

1,814,147

UNITED STATES PATENT OFFICE

PHILIP H. GROGGINS, OF WASHINGTON, DISTRICT OF COLUMBIA; DEDICATED, BY ASSIGNMENT, TO THE GOVERNMENT AND THE PEOPLE OF THE UNITED STATES OF AMERICA

PROCESS FOR THE PREPARATION OF 2-HALOGEN-BETA-PHENYL-ANTHRAQUINONE

No Drawing.   Application filed August 8, 1929. Serial No. 384,514.

(GRANTED UNDER THE ACT OF MARCH 3, 1883, AS AMENDED APRIL 30, 1928; 370 O. G. 757)

This application is made under the act approved April 30, 1928, and the invention herein described may be manufactured and used by and for the Government for governmental purposes without payment to me of any royalty thereon.

My invention relates to 2-halogen-beta-phenyl-anthraquinones and a process for making the same.

It is the object of my invention to provide a simple and economically practicable method for making 2-halogen-beta-phenyl-anthraquinones, which are new and valuable intermediates for the preparation of dyestuffs. Other and further aspects of this invention will be apparent from the disclosures in the specification and appended claims.

I have discovered that 2-halogen-para-phenyl-ortho-benzoyl-benzoic acid which has been described in my copending application Serial No. 384,507 filed August 8, 1929, under certain conditions loses one molecule of water and closes the ring to form 2-halogen-beta-phenyl-anthraquinones. This reaction is probably best expressed by the following equation in which hlg represents a halogen atom, such as chlorine or bromine:

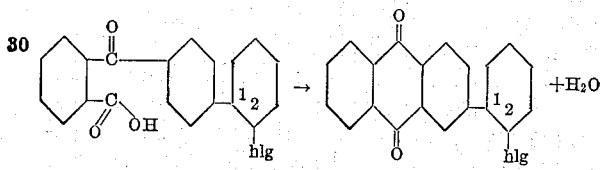

I have discovered that the elimination of water from 2-halogen-para-phenyl-ortho-benzoyl-benzoic acid may be brought about by treating with suitable dehydrating agents such as sulfuric acid, sulfuryl chloride or aluminum chloride. I prefer to carry out the dehydrating process in the presence of an inert solvent such as nitrobenzene, kerosene, nitrotoluene, or dichlorobenzene. I further prefer to use nitrobenzene as the inert solvent, because it is cheap, and is an excellent solvent for the keto acid as well as the resultant 2-halogen-beta-phenyl-anthraquinones. It is finally easily separated and recovered.

I have further ascertained that it is not necessary to first prepare 2-halogen-para-phenyl-ortho-benzoyl-benzoic acid and then treat it in solution with suitable dehydrating agents, since it is practicable to use the anhydrous intermediate compound that results from the condensation of phthalic anhydride with 2-halogen diphenyl. The preparation of this anhydrous aluminum base is described in my co-pending application Serial No. 384507, dated August 8, 1929.

Without limiting myself to any particular procedure the following examples will serve to illustrate my invention in the preferred forms.

*Example 1.*—One hundred parts of 2-chloro-para-phenyl-ortho-benzoyl-benzoic acid are treated with 400 parts of 95 per cent sulfuric acid in the presence of 100 parts of nitrobenzene. The mixture is heated for three hours at 125° C. and the 2-chloro-beta-phenyl-anthraquinone obtained by cooling, diluting, and removing the nitrobenzene by distillation with steam. The product is boiled with dilute alkali and filtered. The crude product melts at 203° C. The purified product melts at 204.5–205° C.

2-chloro-beta-phenyl-anthraquinone is a light yellow product which crystallizes from chlorobenzene in short needles. It gives all the typical reactions of anthraquinone derivatives of this type. It vats to a cherry red color in a hydrosulfite bath and is precipitated as a bright yellow powder upon oxidation.

*Example 2.*—One hundred parts of 2-chloro-para-phenyl-ortho-benzoyl-benzoic acid are treated with one hundred parts of sulfuryl chloride in the presence of one hundred parts of nitrobenzene. The charge is refluxed for a period of two hours and then cooled. Water is added and the nitrobenzene distilled with steam. A bright yellow product is obtained which is boiled with dilute alkali and then filtered and washed with hot water.

*Example 3.*—Three hundred thirty-six and five-tenths parts of 2-chloro-para-phenyl-ortho-benzoyl-benzoic acid are mixed with 1500 parts of nitrobenzene, and 267 parts of anhydrous aluminum chloride are slowly added. The ingredients are thoroughly agitated and the temperature brought up to 185° C. and maintained at that point for two hours. The reaction mass is then slowly delivered into cold dilute hydrochloric acid. The nitrobenzene is recovered by distillation with steam and the remaining crude 2-chloro-beta-phenyl-anthra-quinone is obtained by filtration.

*Example 4.*—The anhydrous aluminum base of 2-chloro-para-phenyl-ortho-benzoyl-benzoic acid which has been prepared by condensing approximately 148 parts of phthalic anhydride with 188.5 parts of 2-chloro-diphenyl in the presence of 285 parts aluminum chloride, is dissolved in a mixture of 1000 parts each nitrobenzene and ortho-dichlorobenzene. The temperature of the batch is raised from 100° to 200° C. with constant agitation. After the reaction is completed the charge is cooled and acidified with dilute hydrochloric acid. The 2-chloro-beta-phenyl-anthraquinone is precipitated by distilling the solvents with steam. The crude product is then boiled with dilute alkali and after filtration is recrystallized from a suitable solvent.

I have ascertained that the use of an inert, organic, aromatic solvent which has a boiling point of 100° C. or less is not suitable in the dehydration reaction. The higher boiling inert, organic, aromatic solvents, particularly those which boil above 150° C. for example, nitrobenzene, are suitable.

I am aware that many changes may be made and numerous details of the process may be varied through a wide range without departing from the principles of this invention, and I therefore do not purpose limiting the patent granted hereon, otherwise than necessitated by the prior art.

I claim as my invention—

1. The process of preparing 2-halogen-beta-phenyl-anthraquinone which comprises heating the aluminum base of 2-halogen-para-phenyl-ortho-benzoyl-benzoic acid with nitrobenzene at a temperature above 100° C.

2. The process of preparing 2-chloro-beta-phenyl-anthraquinone which comprises heating 2-chloro-para-phenyl-ortho-benzoyl-benzoic acid with fuming sulphuric acid in the presence of an inert organic, aromatic solvent having a boiling point above 100° C.

3. The process of preparing 2-chloro-beta-phenyl-anthraquinone which comprises heating 2-chloro-para-phenyl-ortho-benzoyl-benzoic acid with 95 per cent sulphuric acid in the presence of nitrobenzene at a temperature above 100° C. for a period of several hours and then precipitating the product by removing the nitrobenzene with steam.

4. The process of preparing 2-chloro-beta-phenyl-anthraquinone which comprises heating 2-chloro-para-phenyl-ortho-benzoyl-benzoic acid with sulphuryl chloride in the presence of nitrobenzene at a temperature above 100° C. and then precipitating the product by removing the nitrobenzene.

5. The process of preparing 2-chloro-beta-phenyl-anthraquinone which comprises heating 2-chloro-para-phenyl-ortho-benzoyl-benzoic acid with a mixture of 95 per cent sulphuric and boric acids in the presence of nitrobenzene and warming until the elimination of one molecule of water from the keto acid has been completed.

6. The process of preparing 2-halogen-beta-phenyl-anthraquinone which comprises warming 2-halogen-para-phenyl-ortho-benzoyl-benzoic acid with anhydrous aluminum chloride in the presence of an inert organic aromatic solvent having a boiling point above 150° C., the reaction taking place at a temperature above 100° C.

7. The process of preparing 2-chloro-beta-phenyl-anthraquinone which comprises adding anhydrous aluminum chloride to 2-chloro-para-phenyl-ortho - benzoyl - benzoic acid dissolved in nitrobenzene and then raising the temperature up to 185° C. and keeping it at that point until the reaction is completed.

8. The process of preparing 2-chloro-beta-phenyl-anthraquinone which comprises heating the anhydrous aluminum base of 2-chloro-para-phenyl-ortho - benzoyl - benzoic acid in the presence of nitrobenzene and then removing the nitrobenzene by distillation with steam to precipitate out the 2-chloro-beta-phenyl-anthraquinone.

9. The process of preparing 2-halogen-beta-phenyl-anthraquinone which comprises heating the anhydrous aluminum base of 2-halogen-para-phenyl-ortho-benzoyl - benzoic acid in the presence of an inert, organic aromatic solvent having a boiling point in excess of 150° C.

10. As new articles of manufacture 2-halogen - beta - phenyl - anthraquinones having most probably the following chemical formula in which hlg represents a halogen atom.

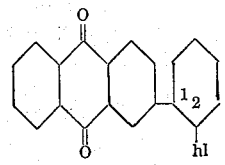

11. As a new article of manufacture 2-chloro-beta-phenyl-anthraquinone having most probably the following chemical formula.
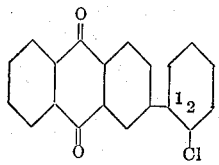
In testimony whereof I have hereunto subscribed my name.
PHILIP H. GROGGINS.